United States Patent
Hoehn et al.

(10) Patent No.: US 7,097,745 B2
(45) Date of Patent: Aug. 29, 2006

(54) METHOD OF FORMING A TUNNELING MAGNETORESISTIVE HEAD

(75) Inventors: Joel William Hoehn, Hudson, WI (US); Cyril Peter DeVries, Bloomington, MN (US); Kristin Joy Duxstad, Eden Prarie, MN (US); Harry Sam Edelman, Minneapolis, MN (US)

(73) Assignee: Seagate Technology, LLC, Scotts Valley, CA (US)

( * ) Notice: Subject to any disclaimer, the term of this patent is extended or adjusted under 35 U.S.C. 154(b) by 353 days.

(21) Appl. No.: 10/607,910

(22) Filed: Jun. 27, 2003

(65) Prior Publication Data

US 2004/0262258 A1 Dec. 30, 2004

(51) Int. Cl.
*C23C 14/34* (2006.01)
(52) U.S. Cl. .................. 204/192.34; 204/192.32; 427/523; 427/524; 427/529; 216/66
(58) Field of Classification Search .......... 204/192.32, 204/192.34; 427/523, 524, 529; 216/66; 360/324.2, 328, 319, 320
See application file for complete search history.

(56) References Cited

U.S. PATENT DOCUMENTS

| 4,130,847 A | 12/1978 | Head et al. |
|---|---|---|
| 4,412,902 A | 11/1983 | Michikami et al. |
| 4,647,494 A | 3/1987 | Meyerson et al. |
| 5,159,508 A | 10/1992 | Grill et al. |
| 5,175,658 A | 12/1992 | Chang et al. |
| 5,271,802 A | 12/1993 | Chang et al. |
| 5,466,495 A | 11/1995 | Pronk et al. |
| 5,858,182 A | 1/1999 | Horng et al. |
| 6,136,421 A | 10/2000 | Chen |
| 6,174,736 B1 * | 1/2001 | Tsukamoto et al. ............ 438/3 |
| 6,335,081 B1 | 1/2002 | Araki et al. |
| 6,359,289 B1 | 3/2002 | Parkin |
| 6,368,425 B1 * | 4/2002 | Segar et al. ................ 148/239 |
| 6,391,419 B1 | 5/2002 | Katayama et al. |
| 2002/0036876 A1 * | 3/2002 | Kawawake et al. ...... 360/324.1 |
| 2003/0034324 A1 | 2/2003 | Ueda et al. |
| 2004/0180608 A1 * | 9/2004 | Church et al. ............... 451/29 |

* cited by examiner

Primary Examiner—Rodney G. McDonald
(74) Attorney, Agent, or Firm—Kinney & Lange, P.A.

(57) ABSTRACT

A method of forming a tunneling magnetoresistive head begins by forming a tunneling magnetoresistive stack having a tunnel barrier. An air bearing surface is formed of the tunneling magnetoresistive stack. The air bearing surface is ion etched causing a deficiency of a constituent in a portion of the tunnel barrier adjacent the air bearing surface. The deficiency of the constituent is replenished in the portion of the tunnel barrier adjacent the air bearing surface to restore the electrical properties of the tunnel barrier.

18 Claims, 13 Drawing Sheets

METHOD OF FORMING A TUNNELING MAGNETORESISTIVE HEAD

BACKGROUND OF THE INVENTION

The present invention relates to a magnetoresistive head for use in a magnetic disc drive, and more particularly, to a method of forming a tunneling magnetoresistive (TMR) head.

A transducing head of a magnetic data storage and retrieval system typically includes a magnetoresistive (MR) reader portion for retrieving magnetic data stored on a magnetic medium. The reader is typically formed of several layers including an MR sensor positioned between two shield layers. The MR sensor may be any one of a plurality of MR-type sensors, including anisotropic magnetoresistive (AMR), giant magnetoresistive (GMR), tunneling giant magnetoresistive (TMR), spin valve, and spin tunneling sensors. When the transducing head is placed near a magnetic medium, a resistance of the MR sensor fluctuates in response to a magnetic field emanating from within transitions in the magnetic medium. By providing a sense current through the MR sensor, the resistance of the sensor can be measured and used by external circuitry to decipher the information stored on the magnetic medium.

TMR heads have proved to be especially attractive for high areal density applications due to their large signal output and reduced shield-to-shield spacing. TMR heads typically include a multi-layered portion called a TMR stack. The TMR stack includes a tunnel barrier layer positioned between two ferromagnetic layers. The tunnel barrier is a very thin electrically insulating layer, such as aluminum oxide ($Al_2O_3$), while the two ferromagnetic layers are typically formed of an electrically conductive ferromagnetic material. On one side of the tunnel barrier, the magnetization direction of the ferromagnetic layer is fixed and provides a reference direction for the TMR head. However, the magnetization direction of the ferromagnetic layer formed on the other side of the tunnel barrier rotates freely in response to an external magnetic field from the magnetic medium.

A sense current is supplied through the ferromagnetic layers and the tunnel barrier and flows perpendicular to the plane of the layers. While the tunnel barrier is an electrically insulating layer, electrons from the sense current can tunnel through the tunnel barrier. As the magnetization of the freely rotating ferromagnetic layer rotates in response to the external magnetic field from the magnetic medium, the resistance of the tunnel barrier changes. This resistance is related to the difference between the magnetization directions of the two ferromagnetic layers. By measuring the change in resistance (for example, by measuring the current flow) the TMR head can read the magnetic bits stored on the magnetic medium.

After the formation of the TMR stack, an air bearing surface is formed normal to the layers of the TMR stack. This is typically accomplished by lapping the TMR stack until the appropriate stripe height has been defined. Stripe height is defined as the height of the TMR stack from the air bearing surface to a back edge of the TMR stack, opposite the air bearing surface. This mechanical lapping process results in the formation of a layer of smearing and debris. It has been found that this layer of smearing and debris is detrimental to the sensitivity of the TMR head because the layer forms an low resistance path between the two ferromagnetic layers allowing electrons to bypass the tunnel barrier. In addition to the problems caused by the smearing and debris layer, the lapping process itself causes a degradation in the insulating properties of the tunnel barrier adjacent to the air bearing surface.

Various methods have been used to remove the smearing and debris layer from the TMR stack to improve the sensitivity of the TMR head. One such method is to use an ion beam etch to etch away the smearing and debris layer by bombarding the air bearing surface with energetic ions, such as argon ions. While the ion beam etch does remove the smearing and debris layer from the air bearing surface, it also results in a damaged layer on the air bearing surface of the TMR stack. The damaged layer, caused by the ion beam etch, includes various types of damage including vacancies, knock-ins, knock-outs, implanted argon, etc.

BRIEF SUMMARY OF THE INVENTION

During the formation of a TMR head, an ion etch forms a damaged region within the TMR stack, adjacent the air bearing surface. The ion damaged region formed by the ion etch has been found to adversely affect the sensitivity of the TMR head. During the ion etch, a constituent of the tunnel barrier, such as an oxide, nitride, or oxynitride, is depleted from a portion of the tunnel barrier. This in turn causes a change in the electrical properties of a portion of the tunnel barrier. Specifically, the resistance of the tunnel barrier is reduced adjacent the air bearing surface. The reduced resistance is detrimental to the sensitivity of the TMR head because it provides a low resistance path adjacent the air bearing surface that is independent of the applied magnetic field. The present invention provides a method of forming a TMR head that heals the damage to the tunnel barrier to restore the electrical properties of the tunnel barrier adjacent to the air bearing surface.

The present invention is a method of forming a TMR head having a TMR stack. The TMR stack includes two electrically conductive ferromagnetic layers separated by an electrically insulating tunnel barrier. The TMR stack is lapped to define an air bearing surface and an appropriate stripe height of the TMR head. The resulting smearing and debris layer is then removed from the air bearing surface using an ion beam etch. The constituent of the tunnel barrier, or a similar constituent, is introduced to the air bearing surface either during or subsequent to the ion beam etch process. The constituent interacts with the material of the tunnel barrier to restore the electrical properties of the tunnel barrier. Finally, a head overcoat, such as a diamond-like carbon can be applied to the air bearing surface of the TMR head.

DETAILED DESCRIPTION

The present invention is a method of forming a TMR head having a TMR stack. In the following detailed description of the invention, a surface of the TMR stack will be referred to as the air bearing surface. It will be understood by one skilled in the art that the air bearing surface refers to the portion of the air bearing surface at the TMR stack, and is not intended to refer to the entire air bearing surface of a slider.

Figure 1:
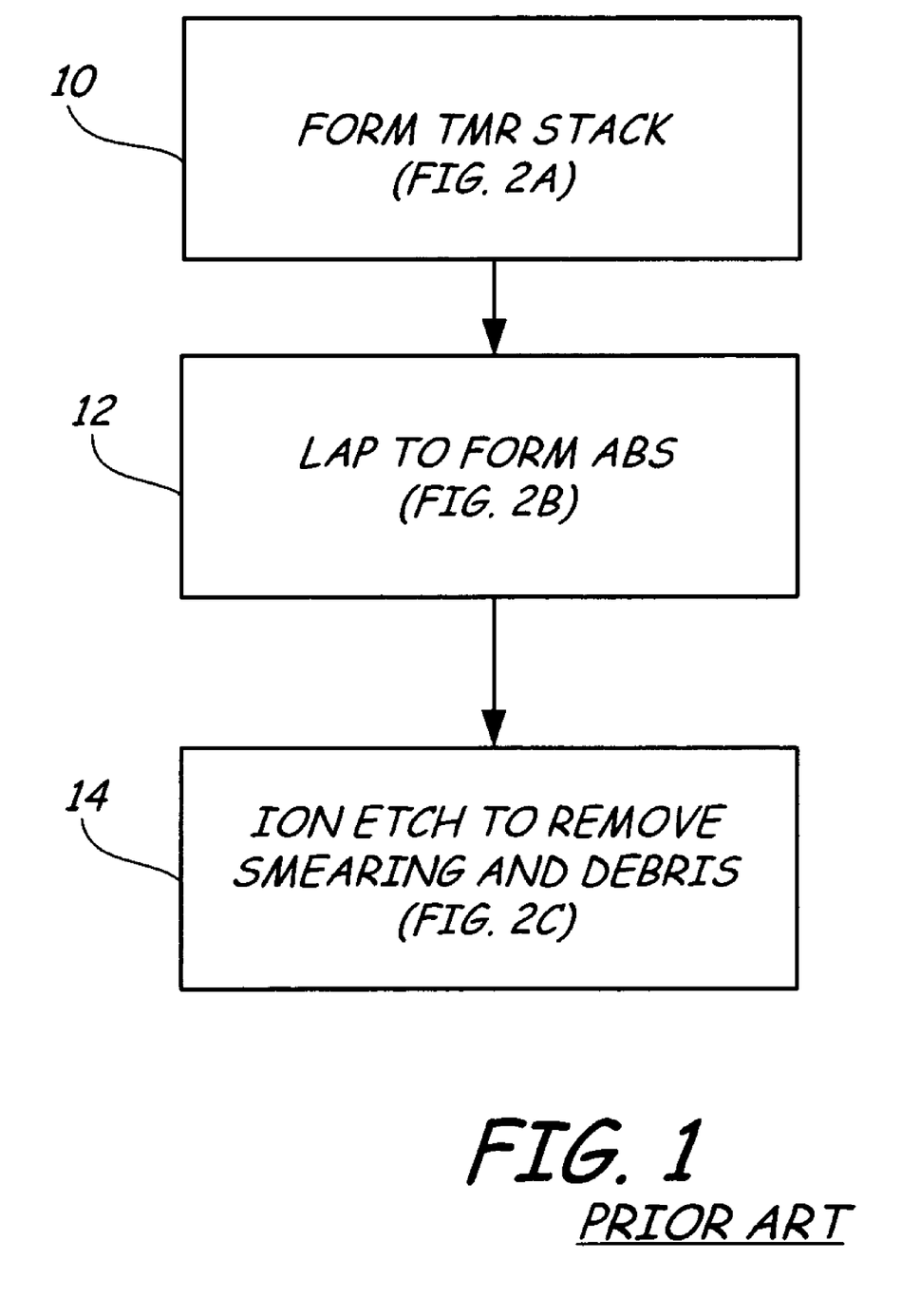
FIG. 1 is a flow diagram illustrating a prior art method of forming a TMR head.

FIG. 1 is a flow diagram illustrating a prior art method of forming TMR head 20. The method, which will be described in more detail with reference to FIGS. 2A–2C, includes three primary steps including form TMR stack step 10 (FIG. 2A), lap to form ABS step 12 (FIG. 2B), and ion etch to remove smearing and debris step 14 (FIG. 2C).

Figure 2A:
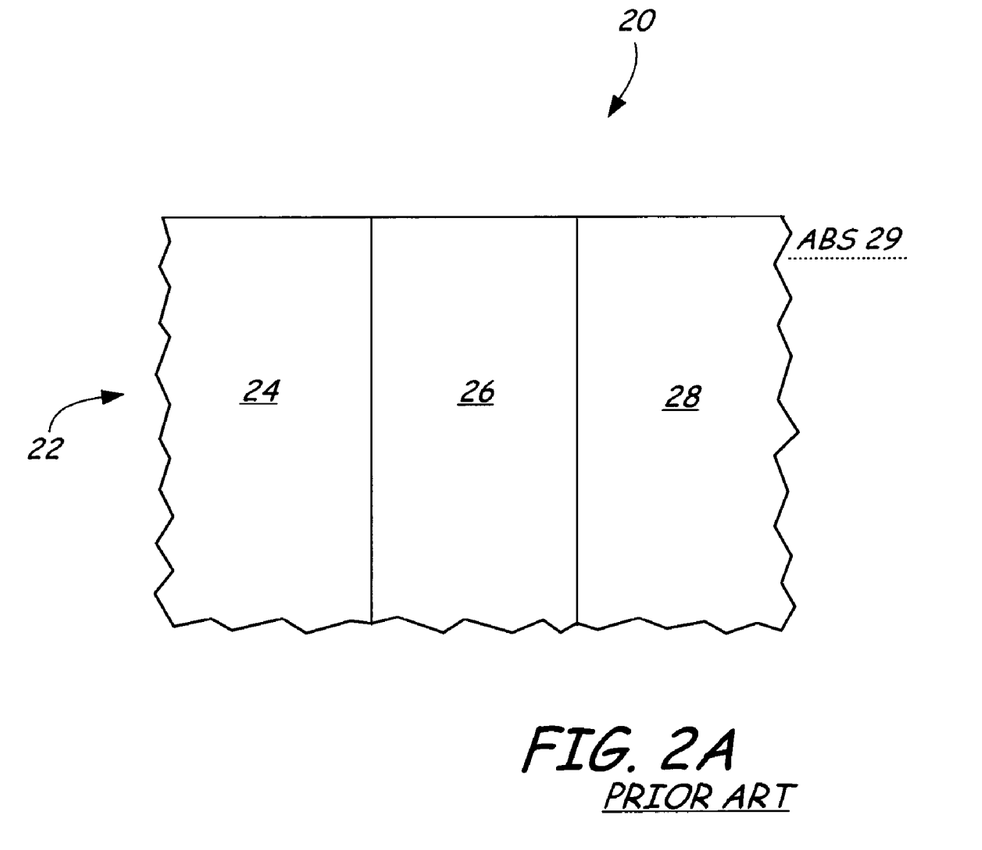
FIG. 2A is a layer diagram illustrating the formation of a prior art TMR stack of the TMR head.
Figure 2B:
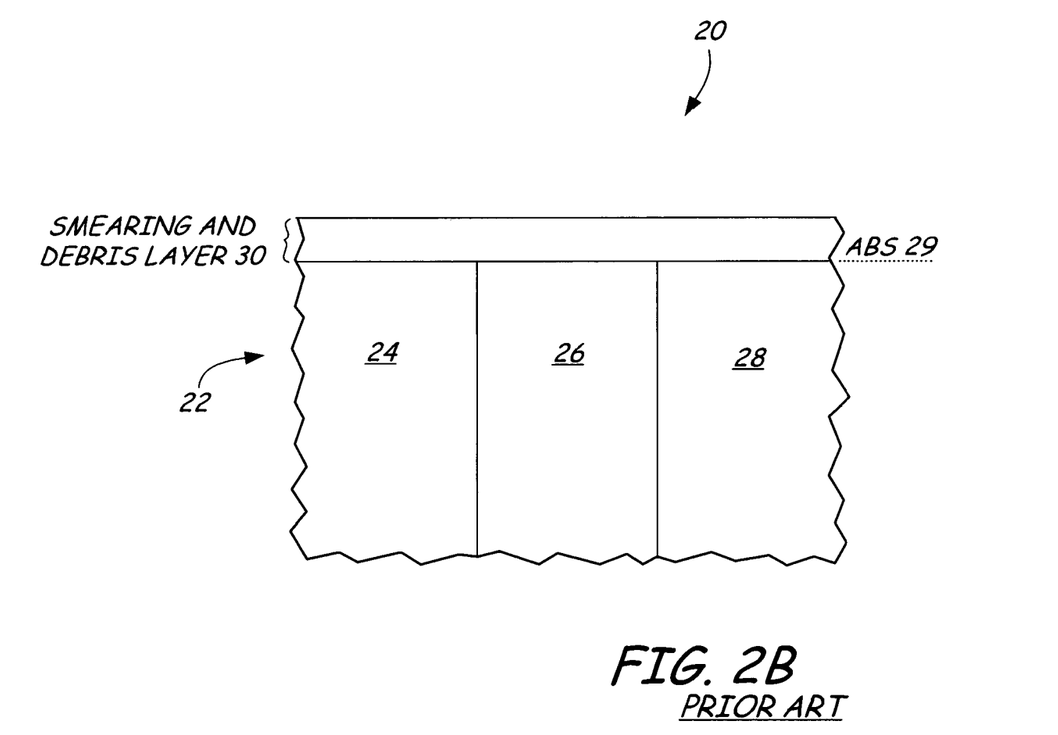
FIG. 2B is a layer diagram of the prior art TMR head after lapping to form an air bearing surface.
Figure 2C:
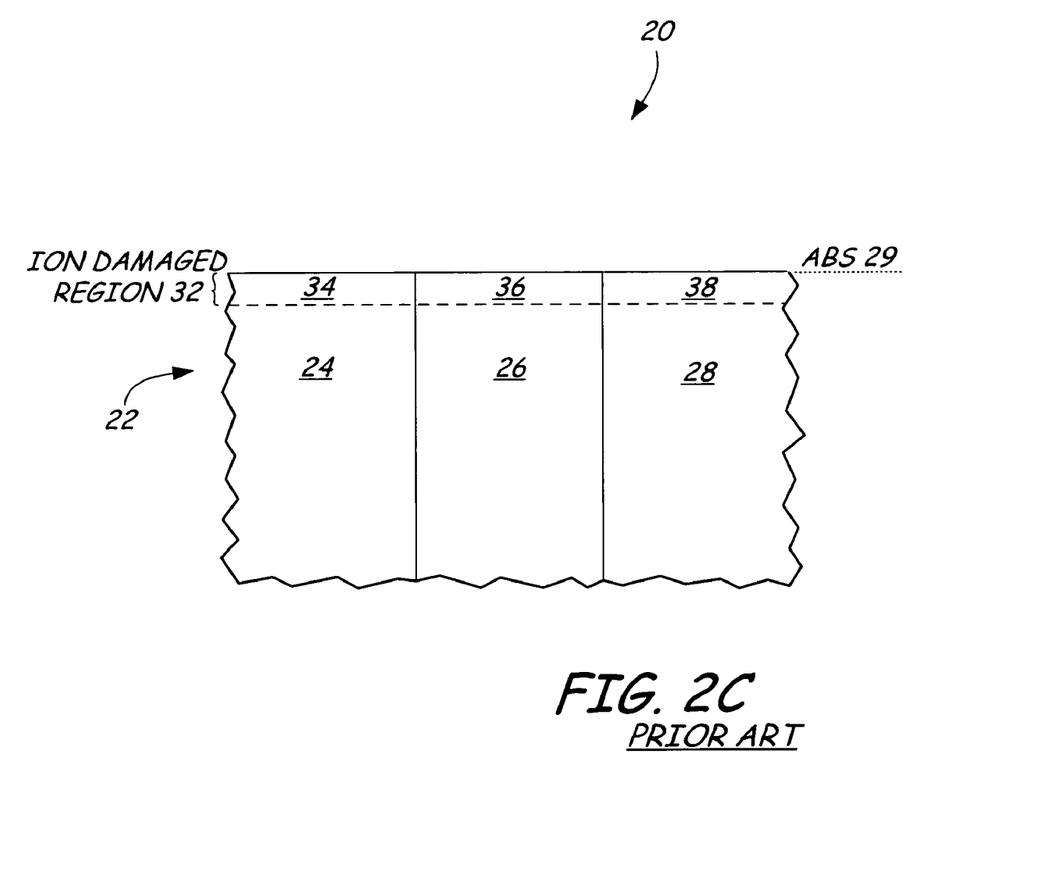
FIG. 2C is a layer diagram of the prior art TMR head after ion etching to remove a smearing and debris layer.

FIGS. 2A–2C illustrate the prior art method of forming TMR head 20. FIG. 2A is a layer diagram illustrating the formation of prior art TMR stack 22 of TMR head 20. TMR stack 22 includes first ferromagnetic layer 24, tunnel barrier 26, and second ferromagnetic layer 28. The desired location of air bearing surface 29 is as shown. Tunnel barrier 26 is formed between first ferromagnetic layer 24 and second ferromagnetic layer 28. Tunnel barrier 26 is a very thin (on the order of 10 angstroms thick) electrically insulating layer, formed of a material such as aluminum oxide ($Al_2O_3$). First ferromagnetic layer 24 and second ferromagnetic layer 28 are electrically conductive layers formed of a ferromagnetic material.

FIG. 2B is a layer diagram of prior art TMR head 20 after lapping to form air bearing surface 29. TMR head 20 includes TMR stack 22 and smearing and debris layer 30. TMR stack 22 includes first ferromagnetic layer 24, tunnel barrier 26, and second ferromagnetic layer 28. Smearing and debris layer 30 roughly defines air bearing surface 29 on TMR stack 22 of TMR head 20.

After the formation of TMR stack 22, TMR stack 22 undergoes a lapping process to form air bearing surface 29. The lapping process defines the stripe height of TMR head 20. The formation of the air bearing surface and stripe height is typically done by lapping a surface of the TMR stack until the appropriate stripe height has been defined. This lapping process produces smearing and debris layer 30 across air bearing surface 29 of TMR stack 22. Since smearing and debris layer 30 includes electrically conductive materials from TMR stack 22, smearing and debris layer 30 forms a low resistance path between first ferromagnetic layer 24 and second ferromagnetic layer 28. It is desirable, during the operation of TMR head 20, for all electrons to tunnel through tunnel barrier 26 with a probability of tunneling related to the magnetic field applied by the magnetic medium. Since the low resistance path of smearing and debris layer 30 allows electrons to flow independent of the applied magnetic field, the low resistance path of smearing and debris layer 30 is detrimental to the operation of TMR head 20.

FIG. 2C is a layer diagram illustrating the prior art TMR head 20 after ion etching to remove smearing and debris layer 30. TMR head 20 includes TMR stack 22. TMR stack 22 includes first ferromagnetic layer 24, tunnel barrier 26, second ferromagnetic layer 28, and ion damaged region 32, which includes first damaged region 34, second damaged region 36, and third damaged region 38. First damaged region 34 is formed adjacent to air bearing surface 29 of first ferromagnetic layer 24. Second damaged region 36 is formed adjacent to air bearing surface 29 of tunnel barrier 26. Third damaged region 38 is formed adjacent to air bearing surface 29 of second ferromagnetic layer 28.

In order to remove smearing and debris layer 30 from air bearing surface 29, a process such as ion beam etching is performed on smearing and debris layer 30 and air bearing surface 29 of TMR stack 22. While the ion beam etch is effective in removing smearing and debris layer 30, it also forms ion damaged region 32 adjacent air bearing surface 29 of TMR stack 22. Ion damaged region 32 is the result of energetic ions bombarding air bearing surface 29 and forming various types of damage including vacancies, knock-ins, knock-outs, and implanted ions within TMR stack 22 adjacent to air bearing surface 29.

It has been found that ion damaged region 32 of prior art TMR head 20 adversely effects the sensitivity of TMR head 20 by forming a low resistance path between first ferromagnetic layer 24 and second ferromagnetic layer 28. Ion damaged region 32, resulting from the ion beam etch, includes second damaged region 36, which is the portion of tunnel barrier 26 adjacent air bearing surface 29. It has been found that second damaged region 36 of tunnel barrier 26 has inferior electrical properties compared to the undamaged portion of tunnel barrier 26 due to the fact that the ion damage causes a deficiency in a constituent of tunnel barrier 26, which could be an oxide, nitride, or oxynitride. Accordingly, the constituent deficiency in ion damaged region 32 forms a low resistance path between first ferromagnetic layer 24 and second ferromagnetic layer 28 in which electrons can bypass tunnel barrier 26 independent of the applied magnetic field. In this way, the sensitivity of TMR head 20 is reduced by the increased electron flow that is not dependent on the applied magnetic field.

Figure 3:
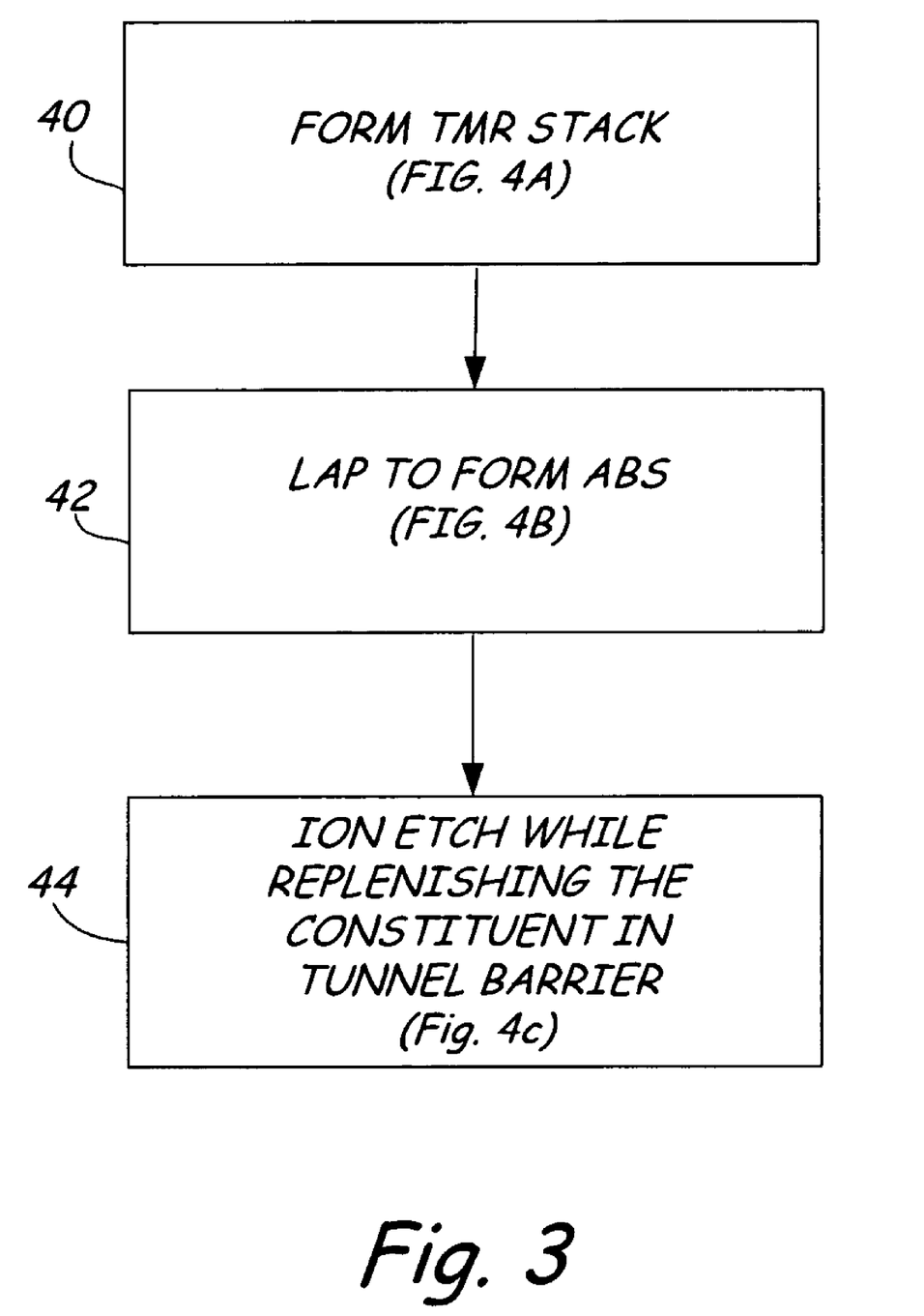
FIG. 3 is a flow diagram illustrating an exemplary method of forming a TMR head of the present invention.

FIG. 3 is a flow diagram illustrating an exemplary method of forming TMR head 50 of the present invention. The method, which will be described in more detail with reference to FIGS. 4A–4C, includes three primary steps including form TMR stack step 40 (FIG. 4A), lap to form ABS step 42 (FIG. 4B), and ion etch while replenishing the constituent in tunnel barrier step 44 (FIG. 4C).

Figure 4A:
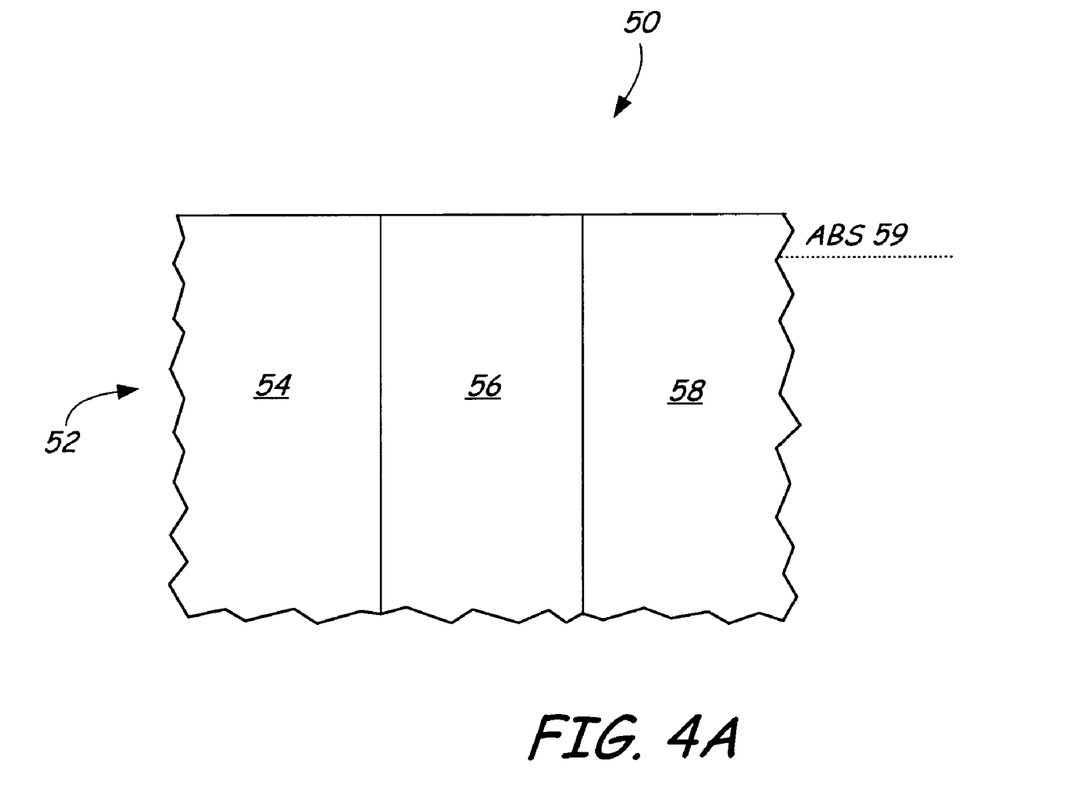
FIG. 4A is a layer diagram illustrating the formation of a TMR stack of the TMR head.
Figure 4B:
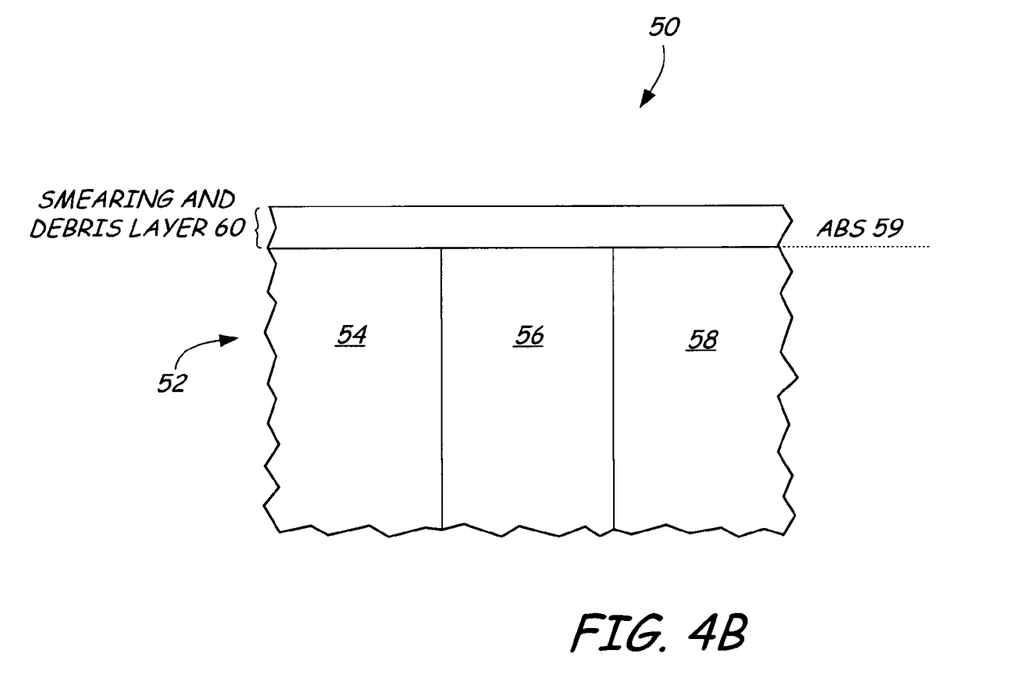
FIG. 4B is a layer diagram illustrating the TMR head after lapping to form an air bearing surface and to define a stripe height of the TMR head.
Figure 4C:
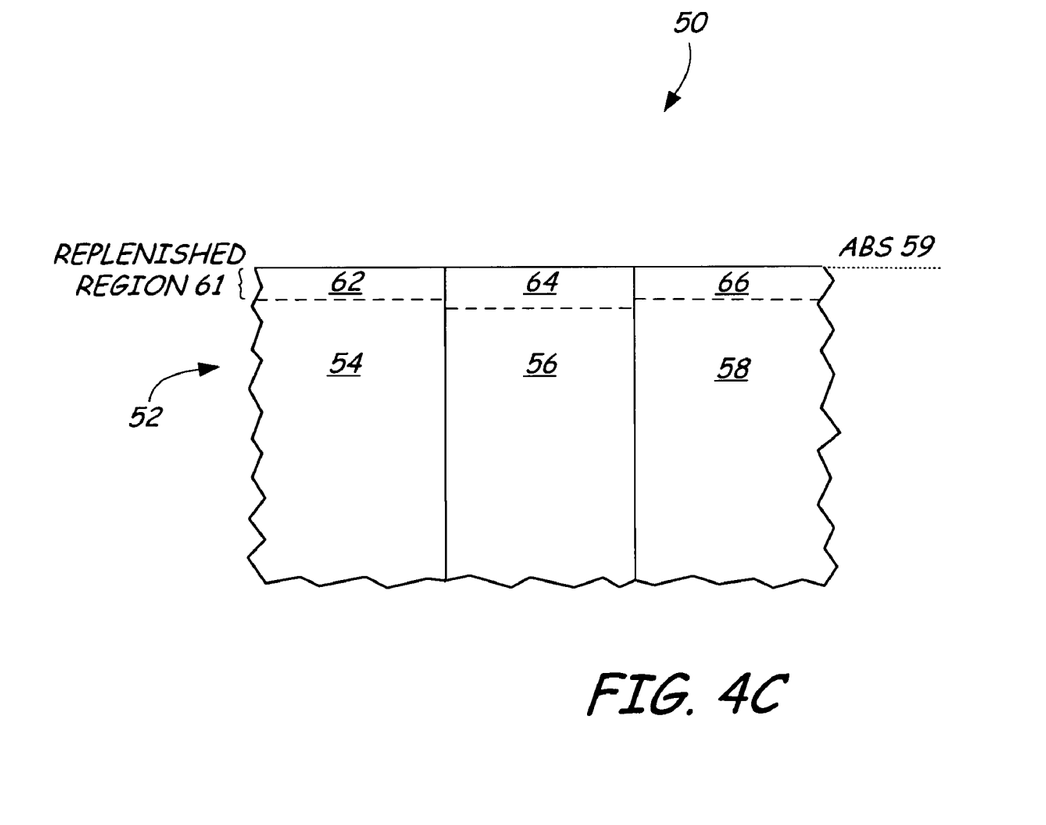
FIG. 4C is a layer diagram of the TMR head after ion etching while replenishing the constituent in tunnel barrier.

FIGS. 4A–4C illustrate an exemplary method of forming TMR head 50 of the present invention. FIG. 4A is a layer diagram illustrating the formation of TMR stack 52 of TMR head 50. TMR stack 52 includes first ferromagnetic layer 54, tunnel barrier 56, and second ferromagnetic layer 58. The desired location of air bearing surface 59 is as shown. Tunnel barrier 56 is positioned between first ferromagnetic layer 54 and second ferromagnetic layer 58. TMR stack 52 is formed by well known semiconductor fabrication processes such as sputtering. First and second ferromagnetic layers 54 and 58 are composed of a ferromagnetic material such as ferromagnetic materials including Co, Ni, Fe, or an alloy composition, for example, $Co_{50}Fe_{50}$. Tunnel barrier 56 is an electrically insulating material which may be formed of an oxide, nitride, or oxynitride of elements such as Hf, Ta, Nd, Ti, Mg, Al, Y, Zr, or Si. In addition, tunnel barrier 56 could be formed of an oxide, nitride, or oxynitride of an alloy of these or other suitable elements. The oxide, nitride, or oxynitride of the tunnel barrier will be referred to as the constituent of the tunnel barrier. Tunnel barrier 56 is a very thin insulating layer. While the exact thickness of the tunnel barrier will depend on the material used, the tunnel barrier is preferably in the range of 1 to 20 angstroms thick.

FIG. 4B is a layer diagram illustrating TMR head 50 after lapping to form air bearing surface 59 and to define the stripe height of TMR head 50. TMR head 50 includes TMR stack 52 and smearing and debris layer 60. TMR stack 52 includes first ferromagnetic layer 54, tunnel barrier 56, and second ferromagnetic layer 58. The air bearing surface and stripe height formation process is performed by a process such as lapping to a surface of TMR stack 52. This process not only defines air bearing surface 59 but also sizes TMR stack 52 of TMR head 50 such that it has the appropriate stripe height. The stripe height of TMR stack 52 is defined as the height of TMR stack 52 from air bearing surface 59 to a back edge of TMR stack 52 (not shown), opposite air bearing surface 59.

Since smearing and debris layer 60 includes portions of electrically conductive layers of TMR stack 52, smearing and debris layer 60 is also electrically conductive. This causes a path of lower resistance than the tunnel barrier to be formed between first ferromagnetic layer 54 and second ferromagnetic layer 58. As was previously described, it is desirable to remove smearing and debris layer 60 from TMR stack 52 to remove this low resistance path.

FIG. 4C is a layer diagram of TMR head 50 after ion etching while replenishing deficiencies in tunnel barrier 56. This step involves the simultaneous removal of smearing and debris layer 60 and the replenishing of the deficient constituent of tunnel barrier 56. TMR head 50 includes TMR stack 52. TMR stack 52 includes first ferromagnetic layer 54, tunnel barrier 56, second ferromagnetic layer 58, air bearing surface 59 and replenished region 61. Replenished region 61 includes first replenished region 62 of first ferromagnetic layer 54, second replenished region 64 of tunnel barrier 56, and third replenished region 66 of second ferromagnetic layer 58.

In order to remove smearing and debris layer 60 from TMR stack 52, a cleaning process such as ion etching is performed on air bearing surface 59 of TMR stack 52. As a part of the ion etching, a precursor gas is provided as an ion source for the ion etching. In an exemplary embodiment of the present invention, a source of the constituent of the tunnel barrier or a similar constituent source, such as an oxygen, nitrogen, or combination of oxygen and nitrogen source is also provided with the precursor gas going into the ion beam, during the ion etching of the air bearing surface. This constituent source supplies a significant portion of constituent ions into the ion beam which subplants the constituent a depth into the surface nominally equivalent to the depth of ion damage. It is recognized that the constituent used to replenish the deficiencies of the constituent of tunnel barrier 56, does not need to be the same constituent as that of tunnel barrier 56. For example, if tunnel barrier 56 is formed of $Al_2O_3$, a nitride or oxynitride could be utilized to replenish the constituent of tunnel barrier 56. In addition, the step of replenishing the constituent does not require that all of the deficiencies of the constituent of tunnel barrier 56 be replenished. Rather, the deficiencies should be sufficiently replenished to ensure that the electrical properties of the tunnel barrier have been sufficiently restored.

The subplanted constituent replenishes the deficiencies in the tunnel barrier, forming replenished region 61. Accordingly, the subplanted constituent restores the electrical properties of the tunnel barrier, thus healing the ion damage to tunnel barrier 56 from the ion etch. This results in the formation of second replenished region 64 of replenished region 61 and tunnel barrier 56. After the formation of second replenished region 64, tunnel barrier 56 has substantially uniform electrical properties extending all the way to the air bearing surface. In particular, the resistance of tunnel barrier 56 is restored to substantially the same value within second replenished region 64 as prior to the ion etch.

It has been found that this exemplary method of forming TMR head 50 results in a significant improvement in the sensitivity of TMR head 50 by eliminating the low resistance path between first ferromagnetic layer 54 and second ferromagnetic layer 58, because the current passing between first ferromagnetic layer 54 and second ferromagnetic layer 58 must tunnel through tunnel barrier 56. This tunneling effect, unlike a direct electrical connection, is dependent upon the applied magnetic field from the magnetic medium. Thus, TMR head 50 has an improved magnetic response over the TMR heads of the prior art.

After the replenishing of tunnel barrier 56, ahead overcoat layer(not shown) would typically be formed on air bearing surface 59 of TMR stack 56. The head overcoat layer is a non-conductive protective layer such as diamond-like carbon (DLC). The head overcoat layer seals air bearing surface 59 and protects TMR stack 52 from corrosion and damage.

Figure 5:
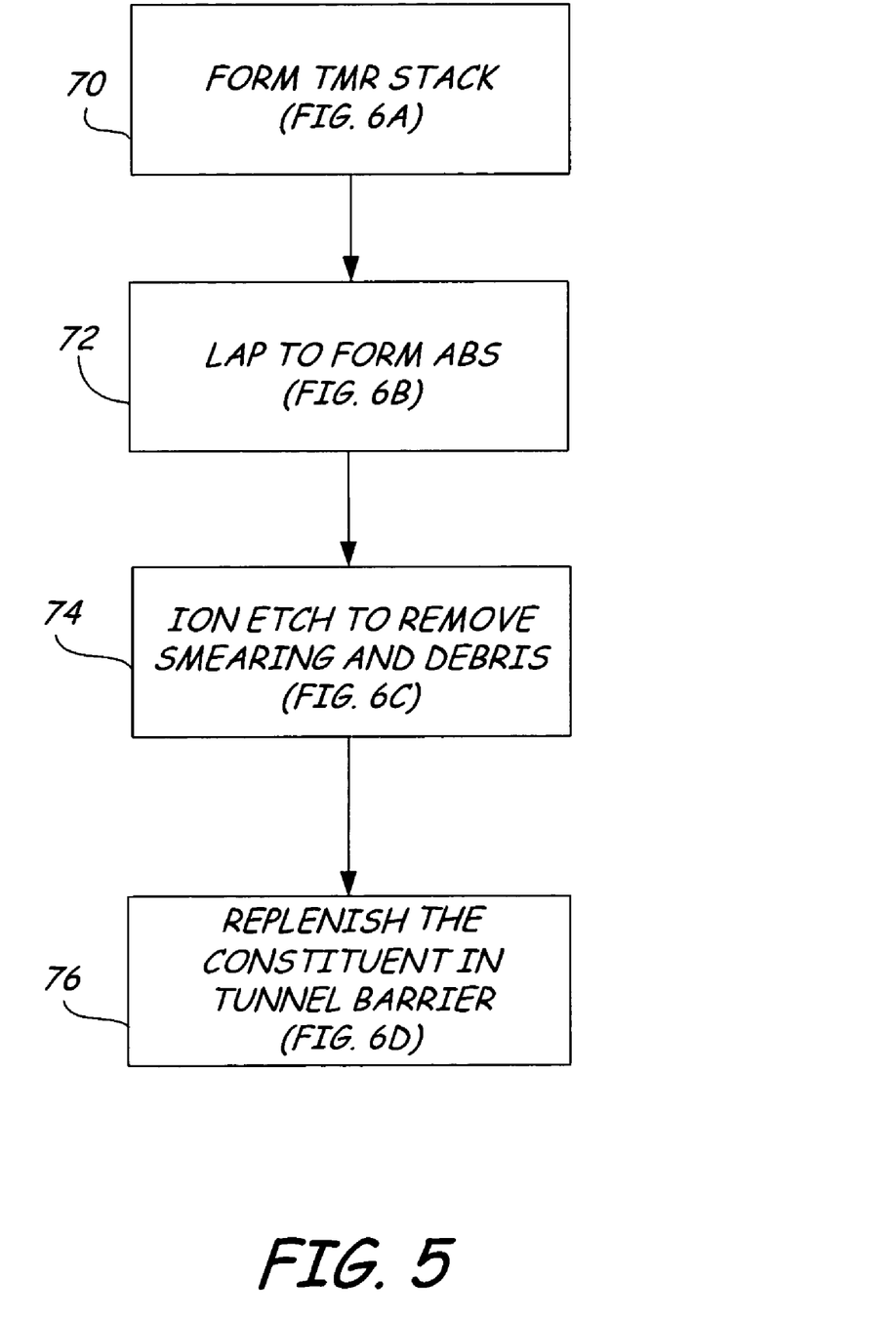
FIG. 5 is a flow diagram illustrating an exemplary method of forming a TMR head of the present invention.

FIG. 5 is a flow diagram illustrating an exemplary method of forming TMR head 80 of the present invention. The method, which will be described in more detail with reference to FIGS. 6A–6D, includes four primary steps including form TMR stack step 70 (FIG. 6A), lap to form ABS step 72 (FIG. 6B), ion etch to remove smearing and debris step 74 (FIG. 6C), and replenish the constituent in tunnel barrier step 76 (FIG. 6D).

Figure 6A:
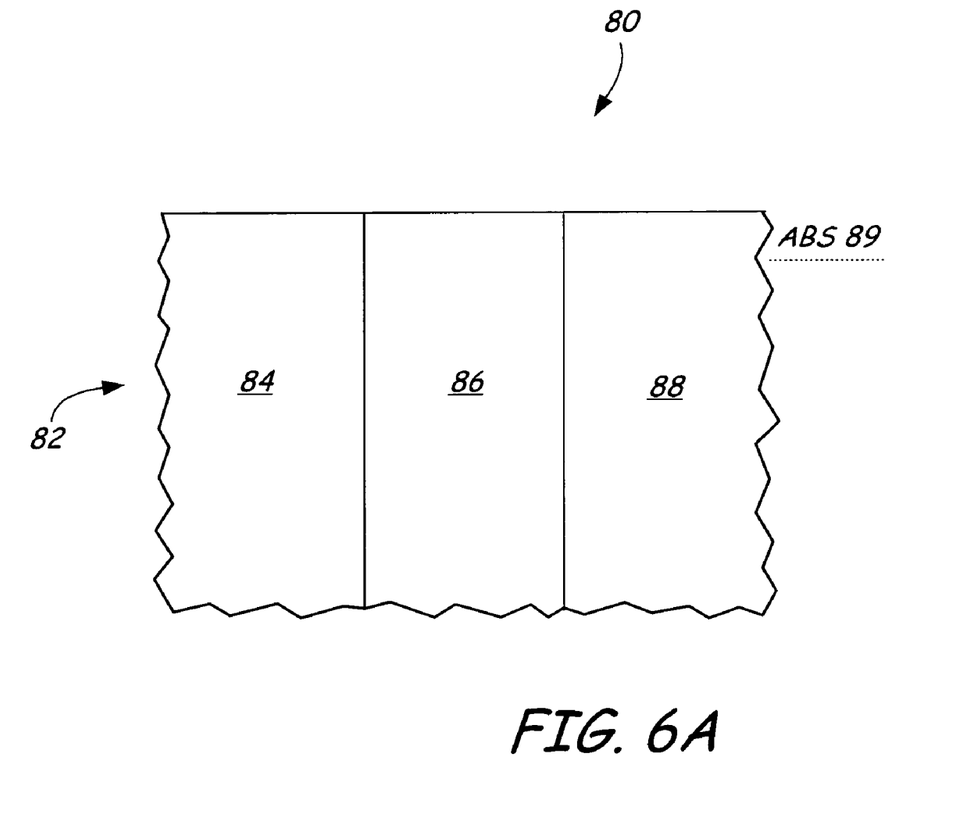
FIG. 6A is a layer diagram illustrating the formation of a TMR stack of the TMR head.
Figure 6B:
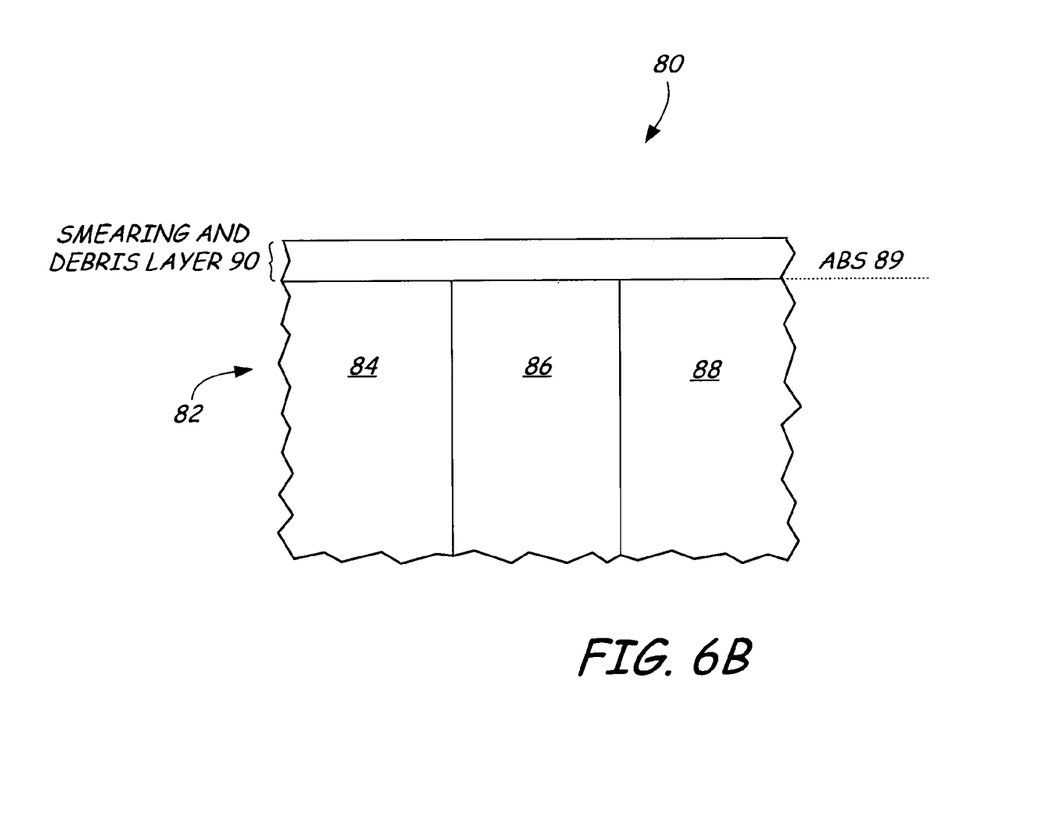
FIG. 6B is a layer diagram illustrating the TMR head after lapping to form the air bearing surface and to define the stripe height of the TMR head.
Figure 6C:
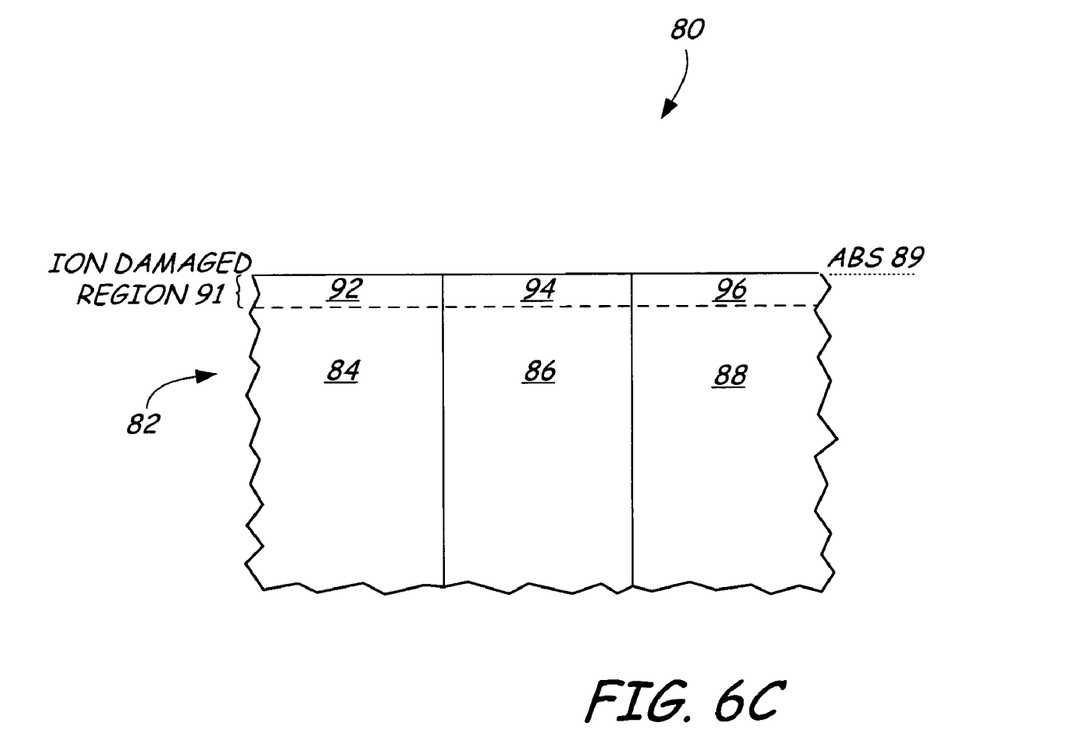
FIG. 6C is a layer diagram illustrating the TMR head after ion etching to remove the smearing and debris layer.
Figure 6D:
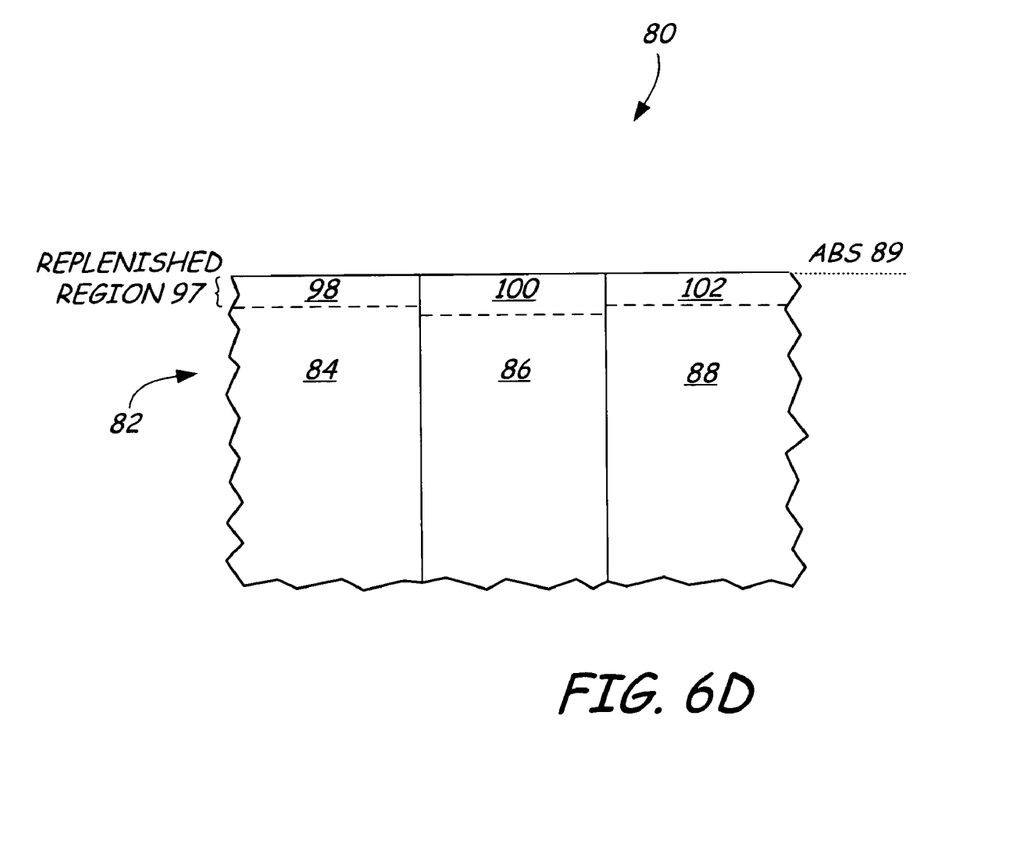
FIG. 6D is a layer diagram illustrating the TMR head after replenishing the constituent in the tunnel barrier.

FIGS. 6A–6D illustrate an exemplary method of forming TMR head 80 of the present invention. FIG. 6A is a layer diagram illustrating the formation of TMR stack 82 of TMR head 80. TMR stack 82 includes first ferromagnetic layer 84, tunnel barrier 86, and second ferromagnetic layer 88. The desired location of air bearing surface 89 is as shown. Tunnel barrier 86 is positioned between first ferromagnetic layer 84 and second ferromagnetic layer 88. TMR stack 82 is formed by well known semiconductor fabrication processes such as sputtering. First and second ferromagnetic layers 84 and 88 are composed of a ferromagnetic material such as ferromagnetic materials including Co, Ni, Fe or an alloy composition of these, for example, $Co_{50}Fe_{50}$. Tunnel barrier 86 is an electrically insulating material which may be formed of an oxide, nitride, or oxynitride of elements such as Hf, Ta, Nd, Ti, Mg, Al, Y, Zr, or Si. In addition, tunnel barrier 86 could be formed of an oxide, nitride, or oxynitride of an alloy of these or other suitable elements. Tunnel barrier 86 is a very thin insulating layer. While the exact thickness of the tunnel barrier will depend on the material used, the tunnel barrier is preferably in the range of 1 to 20 angstroms thick.

FIG. 6B is a layer diagram illustrating TMR head 80 after lapping to form air bearing surface 89 and to define the stripe height of TMR head 80. TMR head 80 includes TMR stack 82 and smearing and debris layer 90. TMR stack 82 includes first ferromagnetic layer 84, tunnel barrier 86, and second ferromagnetic layer 88. The airbearing surface and stripe height formation process is performed by a process such as lapping to a surface of TMR stack 82. This process not only defines air bearing surface 89 but also sizes TMR stack 82 of TMR head 80 such that it has the appropriate stripe height. Stripe height of TMR stack 82 is defined as the height of TMR stack 82 from air bearing surface 89 to a back edge of TMR stack 82 (not shown), opposite air bearing surface 89.

FIG. 6C is a layer diagram illustrating TMR head 80 after ion etching to remove smearing and debris layer 90. TMR head 80 includes TMR stack 82 and ion damaged region 91. TMR stack 82 includes first ferromagnetic layer 84, tunnel barrier 86, and second ferromagnetic layer 88. Ion damaged region 91 includes first damaged region 92, second damaged region 94, and third damaged region 98. Ion damaged region 91 is formed at air bearing surface 89 of TMR stack 82 and includes various types of damage that result from the ion beam etch such as vacancies, knock-ins, knock-outs, implanted ions, etc. This damage causes a deficiency of the constituent in tunnel barrier 86.

It has been found that ion damaged region 91 adversely effects the performance of TMR head 80 by providing a low resistance path between first ferromagnetic layer 84 and second ferromagnetic layer 88, due to the deficiency of the constituent in tunnel barrier 86. In this exemplary embodiment, the constituent of tunnel barrier 86 is not included with a precursor gas during the ion beam etch. Rather, the electrical properties of tunnel barrier 86 at second damaged region 94 are restored subsequent to the ion beam etch.

FIG. 6D is a layer diagram illustrating TMR head 80 after replenishing the constituent in tunnel barrier 86. TMR head 80 includes TMR stack 82. TMR stack 82 includes first ferromagnetic layer 84, tunnel barrier 86, second ferromagnetic layer 88, and replenished region 97. Replenished region 97 includes first replenished region 98 of first ferromagnetic layer 84, second replenished region 100 of tunnel barrier 86, and third replenished region 102 of second ferromagnetic layer 88.

In order to replenish the deficiencies of the constituent in tunnel barrier 86 from the damage caused by the ion beam etch, as shown in FIG. 6C, the air bearing surface of TMR stack 82 is replenished to heal ion damaged region 91, restoring the electrical properties of tunnel barrier 86. The process of replenishing the air bearing surface is performed by exposing ion damaged region 91 to a constituent source such as an oxygen or nitrogen containing ion source, an oxygen or nitrogen radical source, or simply an oxygen or nitrogen source by any suitable process. These processes include natural oxidation, UV oxidation, atomic beam oxidation, ion assisted oxidation, plasma oxidation, ion beam oxidation, or similar processing to produce an oxide, nitride, or oxynitride. By replenishing the air bearing surface of TMR stack 82 with the constituent, ion damaged region 91 is healed by restoring the electrical properties of second replenished region 100 of tunnel barrier 86 adjacent air bearing surface 89. Some of these methods of replenishing the deficiencies of the constituent of tunnel barrier 86, such as ion beam oxidation will form replenished regions in first and second ferromagnetic layers 84 and 88, namely first and third replenished regions 98 and 102. Though first and third replenished regions 98 and 102 form a thin oxide, nitride, or oxynitride layer on conductive first and second ferromagnetic layers 84 and 88, the performance of TMR head 10 is greatly improved by replenishing the deficiencies of the constituent in ion damaged region 91 to form replenished region 97.

It is recognized that the constituent used to replenish the deficiencies of the constituent of tunnel barrier 86 does not need to be the same constituent as that of tunnel barrier 86. For example, if tunnel barrier 86 is formed of $Al_2O_3$, a nitride or oxynitride could be utilized to replenish the constituent of the tunnel barrier. In addition, the step of replenishing the constituent does not require that all of the deficiencies of the constituent of tunnel barrier 86 be replenished. Rather, the deficiencies should be sufficiently replenished to ensure that the electrical properties of the tunnel barrier have been sufficiently restored.

It has been found that this exemplary method of forming TMR head 80 results in a significant improvement in the sensitivity of TMR head 80 by eliminating the low resistance path between first ferromagnetic layer 84 and second ferromagnetic layer 88 by the formation of second replenished region 100, because all current passing between first ferromagnetic layer 84 and second ferromagnetic layer 88 must tunnel through tunnel barrier 86. This tunneling effect, unlike a direct, low resistance connection, is dependent upon the applied magnetic field from the magnetic medium. Thus, TMR head 80 has an improved magnetic response over the TMR heads of the prior art.

After the replenishing of tunnel barrier 86, a head overcoat layer would typically be formed on air bearing surface 89 of TMR stack 82. The head overcoat layer is a non-conductive protective layer such as diamond-like carbon (DLC). The head overcoat layer seals air bearing surface 89 and protects TMR stack 82 from corrosion and damage.

Although the present invention has been described with reference to preferred embodiments, workers skilled in the art will recognize that changes may be made in form and detail without departing from the spirit and scope of the invention.

The invention claimed is:

1. A method of forming a tunneling magnetoresistive head, the method comprising:
   forming a tunneling magnetoresistive stack having a tunnel barrier;
   forming an air bearing surface of the tunneling magnetoresistive stack;
   ion etching the air bearing surface to cause deficiencies of a constituent of the tunnel barrier in a portion of the tunnel barrier adjacent the air bearing surface; and
   replenishing at least a portion of the constituent in the portion of the tunnel barrier adjacent the air bearing surface.

2. The method of claim 1, wherein replenishing the constituent comprises subplanting the constituent into the air bearing surface during ion etching.

3. The method of claim 1, wherein replenishing the constituent comprises exposing the air bearing surface to a constituent source after ion etching.

4. The method of claim 1, wherein forming a tunneling magnetoresistive stack having a tunnel barrier comprises forming a tunnel barrier from a material selected from the group consisting of oxides of Hf, Ta, Nd, Ti, Mg, Al, Y, Zr, and Si.

5. The method of claim 1, wherein forming a tunneling magnetoresistive stack having a tunnel barrier comprises forming a tunnel barrier of an oxide.

6. The method of claim 1, wherein forming a tunneling magnetoresistive stack having a tunnel barrier comprises forming a tunnel barrier of a nitride.

7. The method of claim 1, wherein forming a tunneling magnetoresistive stack having a tunnel barrier comprises forming a tunnel barrier of an oxynitride.

8. The method of claim 1, wherein ion etching the air bearing surface and replenishing the constituent occur simultaneously.

9. A method of forming a tunneling magnetoresistive head, the method comprising:
   forming a tunneling magnetoresistive stack having a tunnel barrier;
   forming an air bearing surface of the tunneling magnetoresistive stack; and
   ion etching the air bearing surface in the presence of a constituent source to replenish a constituent of the tunnel barrier in a portion of the tunnel barrier adjacent the air bearing surface.

10. The method of claim 9, wherein ion etching the surface in the presence of a constituent source comprises ion etching the surface in the presence of oxygen.

11. The method of claim 9, wherein forming a tunneling magnetoresistive stack having a tunnel barrier comprises forming a tunnel barrier of an oxide material.

12. A method of forming a tunneling magnetoresistive head, the method comprising:
   forming a first ferromagnetic layer;
   forming a tunnel barrier on the first ferromagnetic layer;
   forming a second ferromagnetic layer on the tunnel barrier;
   lapping the first ferromagnetic layer, tunnel barrier, and second ferromagnetic layer to form an air bearing surface;
   ion etching the air bearing surface to cause a deficiency of a constituent of the tunnel barrier in a portion of the tunnel barrier adjacent the air bearing surface; and
   replenishing the deficiency of the constituent in the portion of the tunnel barrier adjacent the air bearing surface.

13. The method of claim 12, wherein replenishing the deficiency of the constituent comprises restoring at least one electrical property of the tunnel barrier.

14. The method of claim 12, wherein forming a tunnel barrier on the first ferromagnetic layer comprises forming a tunnel barrier on the first ferromagnetic layer comprising an oxide.

15. The method of claim 12, wherein forming a tunnel barrier on the first ferromagnetic layer comprises forming a tunnel barrier on the first ferromagnetic layer comprising a nitride.

16. The method of claim 12, wherein forming a tunnel barrier on the first ferromagnetic layer comprises forming a tunnel barrier on the first ferromagnetic layer comprising an oxynitride.

17. The method of claim 12, wherein ion etching the air bearing surface and replenishing the deficiency of the constituent occur simultaneously.

18. The method of claim 17, wherein replenishing the deficiency of the constituent comprises restoring at least one electrical property of the tunnel barrier adjacent the air bearing surface.

* * * * *